United States Patent
Chennavasin (10) Patent No.: US 8,635,203 B2
(45) Date of Patent: Jan. 21, 2014

(54) SYSTEMS AND METHODS USING QUERY PATTERNS TO DISAMBIGUATE QUERY INTENT

(75) Inventor: Don Chennavasin, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1510 days.

(21) Appl. No.: 11/560,690

(22) Filed: Nov. 16, 2006

(65) Prior Publication Data

US 2008/0120276 A1 May 22, 2008

(51) Int. Cl.
G06F 7/00 (2006.01)
G06F 17/30 (2006.01)

(52) U.S. Cl.
USPC .............. 707/708; 707/713; 707/758

(58) Field of Classification Search
None
See application file for complete search history.

(56) References Cited

U.S. PATENT DOCUMENTS

| | | | |
|---|---|---|---|
| 6,507,852 B1* | 1/2003 | Dempsey et al. | 707/201 |
| 6,701,309 B1* | 3/2004 | Beeferman et al. | 707/3 |
| 7,051,023 B2 | 5/2006 | Kapur et al. | |
| 7,392,244 B1* | 6/2008 | Dean et al. | 707/3 |
| 2004/0002973 A1* | 1/2004 | Chaudhuri et al. | 707/7 |
| 2004/0186827 A1 | 9/2004 | Anick et al. | |
| 2004/0254920 A1* | 12/2004 | Brill et al. | 707/3 |
| 2005/0080776 A1* | 4/2005 | Colledge et al. | 707/3 |
| 2005/0102259 A1 | 5/2005 | Kapur | |
| 2005/0210024 A1* | 9/2005 | Hurst-Hiller et al. | 707/5 |
| 2006/0004850 A1* | 1/2006 | Chowdhury | 707/103 R |
| 2006/0053065 A1* | 3/2006 | Bowman et al. | 705/26 |
| 2006/0064411 A1* | 3/2006 | Gross et al. | 707/3 |
| 2006/0117003 A1* | 6/2006 | Ortega et al. | 707/4 |
| 2006/0271524 A1* | 11/2006 | Tanne et al. | 707/3 |
| 2007/0078822 A1* | 4/2007 | Cucerzan et al. | 707/3 |
| 2007/0106659 A1* | 5/2007 | Lu et al. | 707/5 |
| 2007/0150470 A1* | 6/2007 | Brave et al. | 707/6 |
| 2007/0214131 A1* | 9/2007 | Cucerzan et al. | 707/5 |
| 2007/0239734 A1* | 10/2007 | Arellanes et al. | 707/10 |
| 2008/0071740 A1* | 3/2008 | Jhala et al. | 707/3 |
| 2008/0082477 A1* | 4/2008 | Dominowska et al. | 707/1 |
| 2008/0082518 A1* | 4/2008 | Loftesness | 707/5 |
| 2008/0104043 A1* | 5/2008 | Garg et al. | 707/4 |
| 2008/0104056 A1* | 5/2008 | Li et al. | 707/5 |
| 2008/0195601 A1* | 8/2008 | Ntoulas et al. | 707/5 |
| 2008/0235225 A1* | 9/2008 | Michele et al. | 707/6 |
| 2009/0037239 A1* | 2/2009 | Wong et al. | 705/7 |
| 2009/0089044 A1* | 4/2009 | Cooper et al. | 704/9 |

OTHER PUBLICATIONS

Wedig et al., A Large-Scale Analysis of Query Logs for Assessing Personalization Opportunities, Aug. 2006, ACM, pp. 742-747.*
U.S. Appl. No. 10/797,614, Kapur et al.
U.S. Appl. No. 10/829,814, Liu et al.
U.S. Appl. No. 11/006,463, Kapur et al.
U.S. Appl. No. 11/006,466, Kapur et al.

* cited by examiner

*Primary Examiner* — Wilson Lee
*Assistant Examiner* — Jessica N Le
(74) *Attorney, Agent, or Firm* — Pillsbury Winthrop Shaw Pittman LLP (57) ABSTRACT

Apparatuses, methods, and systems directed to disambiguating queries. Particular embodiments can be used in connection with query analysis and query rewrite processes to determine the intent of one or more keywords contained in a query.

20 Claims, 6 Drawing Sheets

SYSTEMS AND METHODS USING QUERY PATTERNS TO DISAMBIGUATE QUERY INTENT

TECHNICAL FIELD

The present disclosure relates to query analysis in search and information retrieval systems.

BACKGROUND

The World Wide Web (Web), as its name suggests, is a decentralized global collection of interlinked information, generally in the form of "pages" that may contain text, images, and/or media content related to virtually every topic imaginable. A user who knows or finds a uniform resource locator (URL) for page can provide that URL to a Web client (generally referred to as a browser) and view the page almost instantly. Since Web pages typically include links (also referred to as "hyperlinks") to other pages, finding URLs is generally not difficult.

What is difficult for most users is finding URLs for pages and other resources that are of interest to them. The sheer volume of content available on the Web has turned the task of finding a page relevant to a particular interest into what may be the ultimate needle-in-a-haystack problem. To address this problem, an industry of search providers (e.g., Yahoo!, MSN, and Google) has evolved.

A search provider typically maintains a database of Web pages in which the URL of each page is associated with information (e.g., keywords, category data, etc.) reflecting its content. The search provider also maintains a search server that hosts a search page (or site) on the Web. The search page provides a form into which a user can enter a query that usually includes one or more terms indicative of the user's interest. Once a query is entered, the search server accesses the database and generates a list of "hits," typically URLs for pages whose content matches keywords derived from the user's query. This list is provided to the user.

Since queries can often return hundreds, thousands, or in some cases millions of hits, search providers have developed sophisticated algorithms for ranking the hits (i.e., determining an order for displaying hits to the user) such that the pages most relevant to a given query are likely to appear near the top of the list. Typical ranking algorithms take into account not only the keywords and their frequency of occurrence but also other information such as the number of other pages that link to the hit page, popularity of the hit page among users, and so on. These ranking algorithms are an important part of algorithmic search.

To further facilitate use of their services, some search providers now offer "search toolbar" add-ons for Web browser programs. A search toolbar typically provides a text box into which the user can type a query and a "Submit" button for submitting the query to the search provider's server. Once installed by the user, the search toolbar is generally visible no matter what page the user is viewing, enabling the user to enter a query at any time without first navigating to the search provider's Web site. Searches initiated via the toolbar are processed in the same way as searches initiated at the provider's site; the only difference is that the user is spared the step of navigating to the search provider's site.

While automated search technologies can be very helpful, they do have a number of technological limitations, a primary one being that a user often has difficulty formulating a query to direct the search to relevant content. A query that is too general might return a large quantity of hits, few of which are relevant. A query that is too specific might fail to return many relevant hits. A user often has a fairly specific intent in mind at the time of making a query, but the query might not unambiguously express this intent. For example, a user who enters the query "jaguar" might be thinking of the automobile, rather than the animal, the professional football term, or something else. But the entered query "jaguar" does not express this specific intent.

Until recently, search technologies did not provide reliable ways of disambiguating the intent of a query. U.S. Pat. No. 7,051,023 discloses a search system providing an interface to generate concept units from query logs and to use the concept units to disambiguate the intent of a query. This search technology, however, has limitations of its own. Breaking a query into concept units may or may not disambiguate the intent of a query. For example, for a query "pictures of jaguar", the two concept units "pictures" and "jaguar" would not disambiguate whether the intent of the query is the pictures of the automobile having the "jaguar" brand or the pictures of the animal called jaguar.

SUMMARY OF THE INVENTION

Embodiments of the present invention provide apparatuses, methods, and systems directed to disambiguating queries. Particular embodiments can be used in connection with query analysis and query rewrite processes to determine the intent of one or more keywords contained in a query. In some embodiments, the present invention involves intelligently integrating a set of results for the original query with a set of results for a related query in order to return the set of results most relevant to a user's query.

In one embodiment, the invention is directed to determining the most likely intent associated with one or more keywords (a pattern) based on analysis of search logs. In one embodiment, the process can involve identifying one or more patterns that include a selected term from a query log and selecting one or more intent categories for the term based on the mapping of identified patterns to respective intent categories. In one embodiment, this process is limited to the query log entries within a threshold of a time value and the selected intent categories are also associated with the time value.

In other embodiments of the present invention, the apparatuses, methods, and systems involve sending a received query to a disambiguating engine and determining a disambiguating experience based on the responses from the engine and a threshold value. In one embodiment, a rich disambiguating experience is presented in which text, image, audio, and video results might be merged and presented for a particular intent category determined by the disambiguating engine. In one embodiment, a list of suggested query terms are presented that reflect the intent categories determined by the disambiguating engine.

In still other embodiments, the present invention's apparatuses, methods, and systems involve identifying additional patterns and intent categories for a query. In one embodiment, this process involves identifying additional patterns for terms frequently associated with the query. In one embodiment, this process involves mapping the additional patterns to respective intent categories and selecting additional intent categories for the query.

The following detailed description together with the accompanying drawings will provide a better understanding of the nature and advantages of various embodiments of the present invention.

DESCRIPTION OF EXAMPLE EMBODIMENT(S)

The following example embodiments and their aspects are described and illustrated in conjunction with apparatuses, methods, and systems which are meant to be illustrative examples, not limiting in scope.

A. Network Implementation

Figure 1:
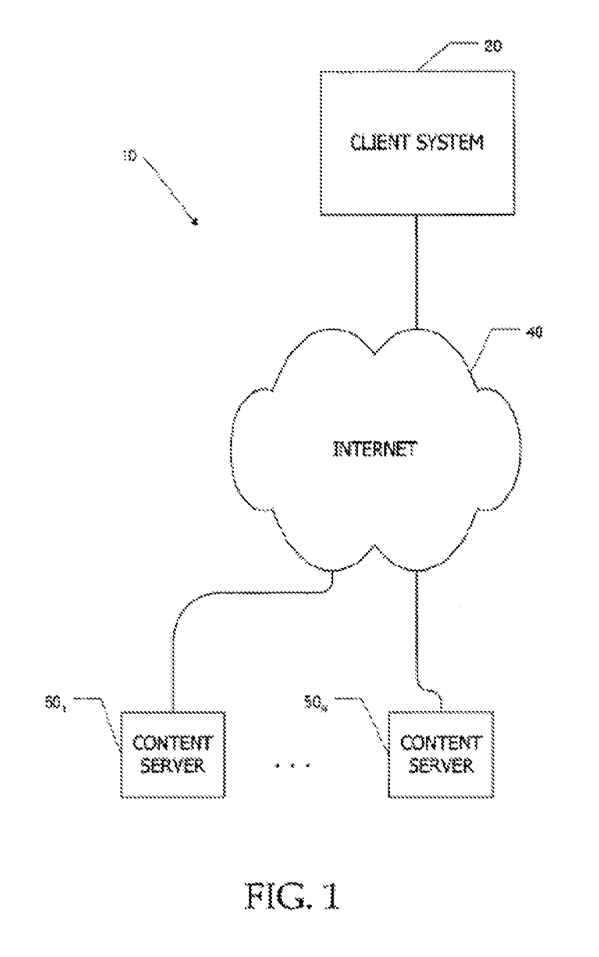
FIG. 1 is a diagram showing an example information retrieval and communication network, which network might be used with an embodiment of the present invention.

FIG. 1 illustrates a general overview of an information retrieval and communication network 10 including a client system 20 according to one particular embodiment of the present invention. In computer network 10, client system 20 is coupled through the Internet 40, or other communication network, e.g., over any local area network (LAN) or wide area network (WAN) connection, to any number of content server systems $50_1$ to $50_N$. As will be described herein, client system 20 is configured according to the present invention to communicate with any of content server systems $50_1$ to $50_N$, e.g., to access, receive, retrieve and/or display media content and other information such as web pages.

As FIG. 1 illustrates, particular embodiments may operate in a network environment including a plurality of hosts and other distributed systems. For example, client system 20 could include a desktop personal computer, workstation, laptop, personal digital assistant (PDA), cell phone, or any WAP (Wireless Application Protocol)-enabled device or any other computing device capable of interfacing directly or indirectly to the Internet. Client system 20 typically runs a browsing program, such as Microsoft's Internet Explorer™ browser, Netscape Navigator™ browser, Mozilla Firefox™ browser, Opera™ browser, or a WAP-enabled browser in the case of a cell phone, PDA or other wireless device, or the like, allowing a user of client system 20 to access, process and view information and pages available to it from content server systems $50_1$ to $50_N$ over Internet 40.

Client system 20 also typically includes one or more user interface devices, such as a keyboard, a mouse, touch screen, pen or the like, for interacting with a graphical user interface (GUI) provided by the browser on a display (e.g., monitor screen, LCD display, etc.), in conjunction with pages, forms and other information provided by content server systems $50_1$ to $50_N$ or other servers. The present invention is suitable for use with the Internet, which refers to a specific global network of networks. However, it should be understood that other networks can be used instead of or in addition to the Internet, such as an intranet, and extranet, a virtual private network (VPN), a non-TCP/IP based network, any LAN or WAN or the like.

According to one embodiment, client system 20 and all of its components are configurable and made operative using an application including computer code run using a central processing unit such as an Intel x86-compatible microprocessor, an AMD x86-compatible microprocessor, or the like or multiple microprocessors. Computer code for configuring and operating client system 20 to communicate, process and display data and media content as described herein is preferable downloaded and stored on a hard disk, but the entire program code, or portions thereof, may also be stored in any other volatile or non-volatile memory medium or device such as a ROM or RAM, or provided on any media capable of storing program code, such as a compact disk (CD) medium, a digital video disk (DVD) medium, a floppy disk, and the like. Additionally, the entire program code, or portions thereof, may be transmitted and downloaded from a software source, e.g., from one of content server systems $50_1$ to $50_N$ to client system 20 over the Internet, or transmitted over any other network connection (e.g., extranet, VPN, LAN, or other conventional networks) using any communication medium and protocol (e.g., TCP/IP, HTTP, HTTPS, Ethernet, or other conventional media and protocol).

It should be appreciated that computer code for implementing embodiments of the present invention can be C, C++, HTML, XML, Java, JavaScript, etc., or any suitable scripting language, e.g., VBScript, or any other suitable programming language that can be executed on client system 20 or compiled to execute on client system 20. In some embodiments, no code is downloaded to client system 20, and needed code is executed by a server, or code already present at client system 20 is executed.

B. Search System

Figure 2:
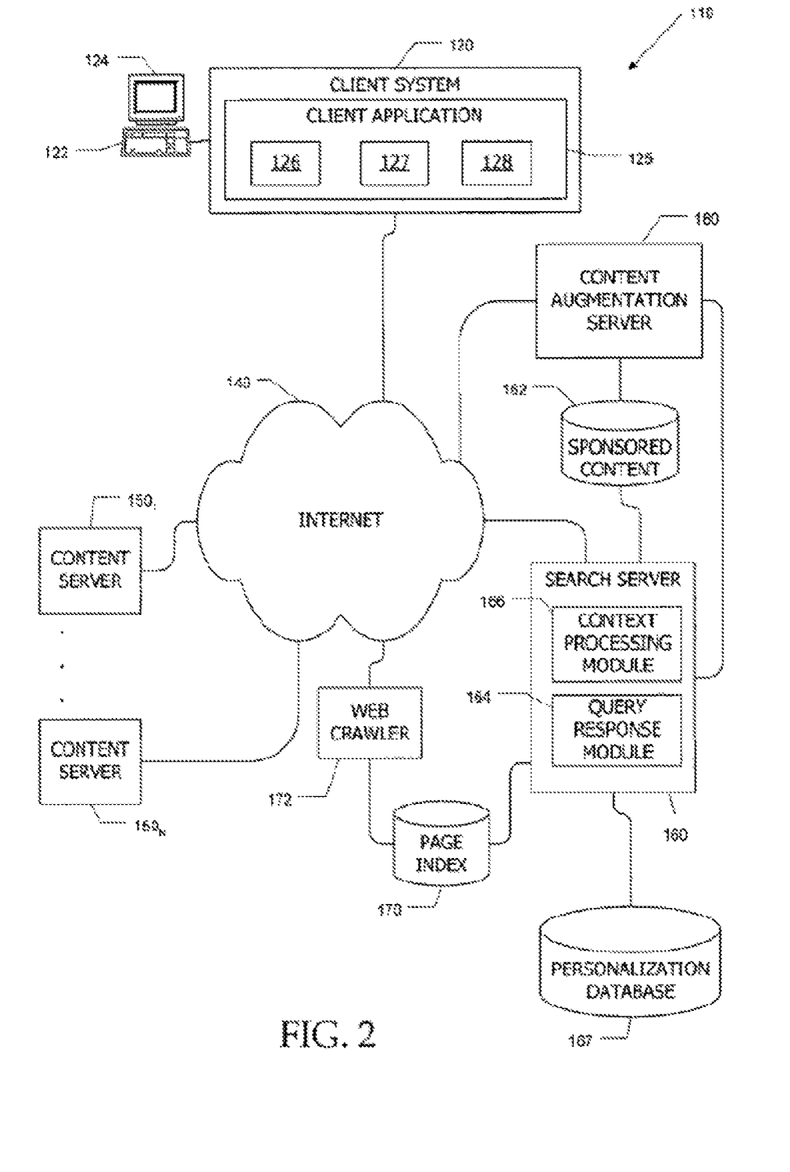
FIG. 2 is a diagram showing an example information retrieval and communication network that enables algorithmic and contextual search queries, which network might be used with an embodiment of the present invention.

FIG. 2 illustrates another example of an information retrieval and communication network 110 for communicating media content according to an embodiment of the invention. As shown, network 110 includes client system 120 (which corresponds to client system 20 in FIG. 1), one or more content server systems 150 (which correspond to content server systems $50_1$ to $50_N$ in FIG. 1), and a search server system 160. In network 110, client system 120 is communicably coupled through Internet 140 or other communication network to server systems 150 and 160. As discussed above, client system 120 and its components might be configured to communicate with server systems 150 and 160 and other server systems over Internet 140 or other communication networks.

1. Client System

According to one embodiment, a client application (represented as module 125) executing on client system 120 includes instructions for controlling client system 120 and its components to communicate with server systems 150 and 160 and to process and display data content received from those server systems. Client application 125 may be transmitted and downloaded to client system 120 from a software source such as a remote server system (e.g., server systems 150, server system 160 or other remote server system), or client application module 125 may also be provided on any software storage medium (floppy disk, CD, DVD, etc.) that is readable by client system 120 ad discussed above. For example, in one embodiment, client application 125 may be provided over Internet 140 to client system 120 in an HTML wrapper including various controls such as, for example, embedded JavaScript or Active X controls, for manipulating data and rendering data in various objects, frames, and windows.

Client application module 125 advantageously includes various software modules for processing data and media content. In one embodiment, these modules include a specialized search module 126, a user interface module 127, and an application interface module 128. Specialized search module 126 is configured for processing search requests (also referred to herein as queries) to be sent to search server 160 and search result data received from search server 160. Specific embodiments of specialized search module 126 are described below.

User interface module 127 is configured for rendering data and media content in text and data frames and active windows, e.g., browser windows and dialog boxes. In some embodiments, user interface module 127 includes or communicates with a browser program, which may be a default browser configured on client system 120 or a different browser. Application interface module 128 is configured to support interfacing and communicating between client application 125 and various other applications executing on client 120, such as e-mail applications, instant messaging (IM) applications, browser applications, document management applications and others.

User interface module 127 advantageously provides user input interfaces allowing the user to enter queries for processing by search server system 160. For example, where user interface module 127 includes or communicates with a browser, the user may be able to enter a URL or activate a control button to direct the browser to a Web search page (or site) from which the user can submit a query to search server system 160 for processing. In addition or instead, user interface module 127 may include a search toolbar or other interface via which the user can enter and submit a query without first navigating to the search page. Queries entered using user interface module 127 may be preprocessed by specialized search module 126 prior to being sent to search server system 160, e.g., to remove so-called "stop words") ("the," "and," etc.), to correct spelling errors, or the like.

In accordance with an embodiment of the present invention, client application 125 may include various features for adding context information (referred to herein as a "context vector") to the use's queries. For example, specialized search module 126 may be configured to generate context vectors based on content the user is currently viewing at the time a query is entered. As another example, in some embodiments of the present invention, Web pages displayed in the browser may include one or more context vectors that can be used to supplement user-entered queries. User interface module 127 may be configured to detect such contextual vectors in a page being displayed and use context vector data to supplement a query entered by the user. Alternatively, user interface module 127 may be configured to allow the user to enter contextual information in an interface component such as a window.

2. Search Server System

According to one embodiment of the invention, search server system 160 is configured to provide search result data and media content to client system 120, and content server system 150 is configured to provide data and media content such as web pages to client system 120, for example, in response to links selected by the user in search result pages provided by search server system 160. In some variations, search server system 160 returns content as well as, or instead of, links and/or other references to content.

Search server system 160 references various page indexes 170 that are populated with, e.g., pages, links to pages, data representing the content of indexed pages, etc. Page indexes may be generated by various collection technologies such as an automatic web crawler 172; in addition, manual or semi-automatic classification algorithms and interfaces may be provided for classifying and ranking web pages within a hierarchical category structure. Such technologies and algorithms may be of generally conventional design, and a detailed description is omitted as not being critical to the present invention.

In one embodiment, an entry in page index 170 includes a search term, a reference (e.g., a URL or other encoded identifier) to a page in which that term appears and a context identifier for the page. The context identifier may be used for grouping similar results for search terms that may have different meanings in different contexts. For example, the search term "jaguar" may refer to the British automobile, to an animal, to a professional football team, and so on. The context identifier for a page can be used to indicate which of these contexts is applicable. In one embodiment, the context identifier includes a category for the page, with the category being assigned from a predefined hierarchical taxonomy of content categories. A page reference may be associated with multiple context identifiers, so the same page (or a link thereto) may be displayed in multiple contexts. In some embodiments, context identifiers are automatically associated with page links by the system as users perform various searches; the identifiers may also be modified and associated with links manually be a team of one or more index editors.

Search server system 160 is configured to provide data responsive to various search requests received from a client system 120, in particular from search module 126 and/or user interface module 127. For example, search server system 160 may include a query response module 164 that is configured with search related algorithms for identifying and ranking Web pages relative to a given query, e.g., based on a combination of logical relevance (which may be measured by patterns of occurrence of search terms in the query), context identifiers, page sponsorship, etc. In an embodiment of the present invention, algorithmic search comprises some of these algorithms.

In accordance with an embodiment of the present invention, query response module 164 is also configured to receive and make use of context vector data that may be provided in association with a query in order to further enhance the response to queries. Use of context vector data in responding to queries is described further below. Query response module 164 may also enhance search result information with additional information (e.g., links and/or advertising copy) obtained from a sponsored content database 162. Sponsored content database 162 may be implemented as part of page index 170 by the inclusion of additional fields in each entry to identify page references that are sponsored and keywords for triggering the display of sponsored content, or it may be implemented in a separate database.

In some embodiments, search server 160 also includes a context processing module 166 that is configured with various algorithms for processing received content to generate a context vector representative of the received content. In general, a context vector may include any data that represents all or part of the content. For example, one embodiment of a context vector for text content may include keywords such as terms (e.g., words or phrases) that appear in the content, and each such term may have an associated frequency count reflecting how many times that term occurs in the content. Other types of data may also be included, e.g., URLs or other data identifying any links that may be included in the content, the URL or other identifier of the page that contains the content, category data associated with the content or with a page that contains the content, and so on. In some embodiments of the present invention, contextual search makes use of these algorithms for processing received content.

In some embodiments, a content augmentation server 180 is also provided. Content augmentation server 180 communicates via Internet 140 with client application 125 to enhance the content of a Web page being displayed with "special content" that is advantageously selected based on context vector data associated with the displayed page. In circumstances where the user has indicated an interest in information related to a particular context, client application 125 transmits a context vector to content augmentation server 180, and content augmentation server 180 responds with special content to be added to a Web page being displayed by client application 125.

In one embodiment, content augmentation server 180 and search server 160 are under common control, and content augmentation server 180 advantageously selects special content from sponsored content database 162. In another embodiment, content augmentation server 180 may be independent of search server 160 and may have its own database of special content from which selections can be made based on context vectors provided by client application 125.

A content augmentation server can be implemented in the same computer system as the search server or in a different server, and the content augmentation server may communicate with a client system via the search server or independently of the search server. The content augmentation server advantageously maintains various data stores containing information and rules used to select special content given a particular context vector (or other representation of context data).

Other embodiments include user personalization features allowing data specific to the user as well as the context to inform the selection of search results, including contextual search results, and proposed transactions. For example, the search provider may maintain a user profile for each registered user of its services in a personalization database 167. When a registered user who is logged in executes a search (contextual or otherwise) or clicks through to a proposed transaction from a contextual search interface, information about that operation can be recorded and associated with the user. By analyzing patterns in a given user's behavior, a "user vector" may be developed, which can be used during search processing, e.g., in identifying and/or ranking search results. In some embodiments of the present invention, personalized search makes use of personalization database 167.

It will be appreciated that the search system described herein is illustrative and that variations and modifications are possible. The content server, search server, and content augmentation server systems may be part of a single organization, e.g., a distributed server system such as that provided to users by Yahoo! Inc., or they may be part of disparate organizations. Each server system generally includes at least one server and an associated database system, and may include multiple servers and associated database systems, which although shown as a single block, may be geographically distributed.

For example, all servers of a search server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably.

The search server system may be configured with one or more page indexes and algorithms for accessing the page indexes and providing search results to users in response to search queries received from client systems. The search server system might generate the page indexes itself, receive page indexes from another source (e.g., a separate server system), or receive page indexes from another source and perform further processing thereof (e.g., addition or updating of the context identifiers).

Figure 3:
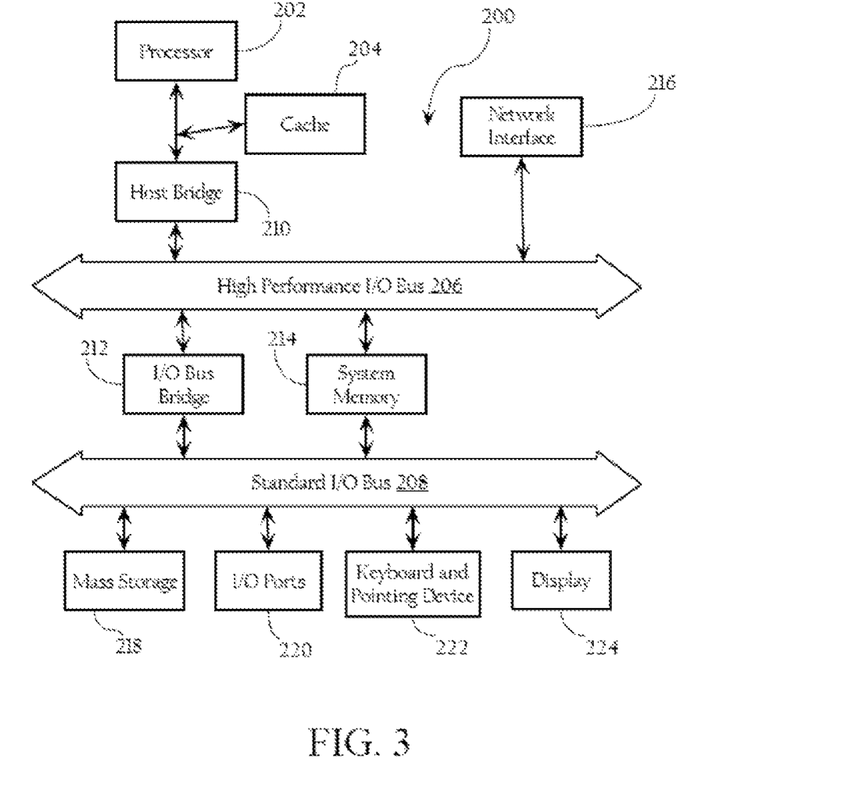
FIG. 3 is a diagram showing an example system architecture for a content server, a search server, or a content augmentation server, which any of which servers might be used by an embodiment of the present invention.

FIG. 3 illustrates, for didactic purposes, a hardware system 200, which may be used to implement a content server, a search server, or a content augmentation server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. In one embodiment, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

In one embodiment, the search operations (algorithmic, contextual, personalized, augmented, etc.) described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP operating system, available from Microsoft Corporation of Redmond, Wash., the Apple Macintosh Operating System, available from Apple Computer Inc. of Cupertino, Calif., UNIX operating systems, and the like.

C. Query Analysis

Figure 4:
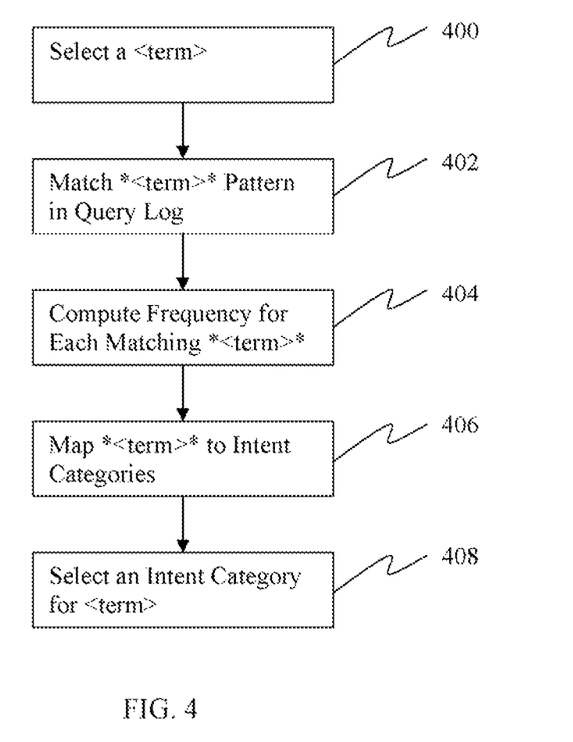
FIG. 4 is a diagram showing a flowchart of the example process used for selecting an intent category for a term.

FIG. 4 shows a flowchart of the process for selecting an intent category for a pattern comprising one or more keywords, which process might be used by an embodiment of the present invention. In the process's first step 400, the embodiment selects a term or pattern which comprises one or more keywords. In some embodiments, the selected terms might be some of the most frequently searched terms within a time period such as a day or a week. In other embodiments, the selected terms might be queries for a developing news story or other significant events. In step 402, the embodiment finds the queries in a query log that match the pattern in the form of *<term>*, where the * denotes one or more keywords and the <term> denotes the selected term. In step 404, the embodiment computes the frequency for each matching pattern. The frequency for a matching pattern is determined by counting the number of occurrences of the matching pattern in the query log. In addition, a confidence value can be computed for each matching pattern by dividing its frequency by an aggregate frequency of all of the matching patterns. In step 406, the embodiment maps a matching pattern to an intent category. In some embodiments, intent categories might be a pre-determined list of types of search such as Image Search, Product Search, Audio Search, Video Search, Local Search, or News Search. In other embodiments, intent categories might be a pre-determined list of classification groups such as Automobiles, Animals, or Sports Teams. In step 408, the process concludes by selecting one or more intent categories for the selected term based on the mappings. The confidence values of the matching patterns in the mappings can be used in this step.

An entry in a query log might also entail a time value that indicates when the query was logged. As described above, step 402 involves finding the queries in the query log that match the pattern. In some embodiments, step 402 might be limited to the log entries having a time value within a threshold period of time. As a result, the confidence values for the matching patterns might change depending on the chosen threshold period of time. The selected one or more intent categories in step 408 will therefore be coupled with the threshold period of time.

Figure 5:
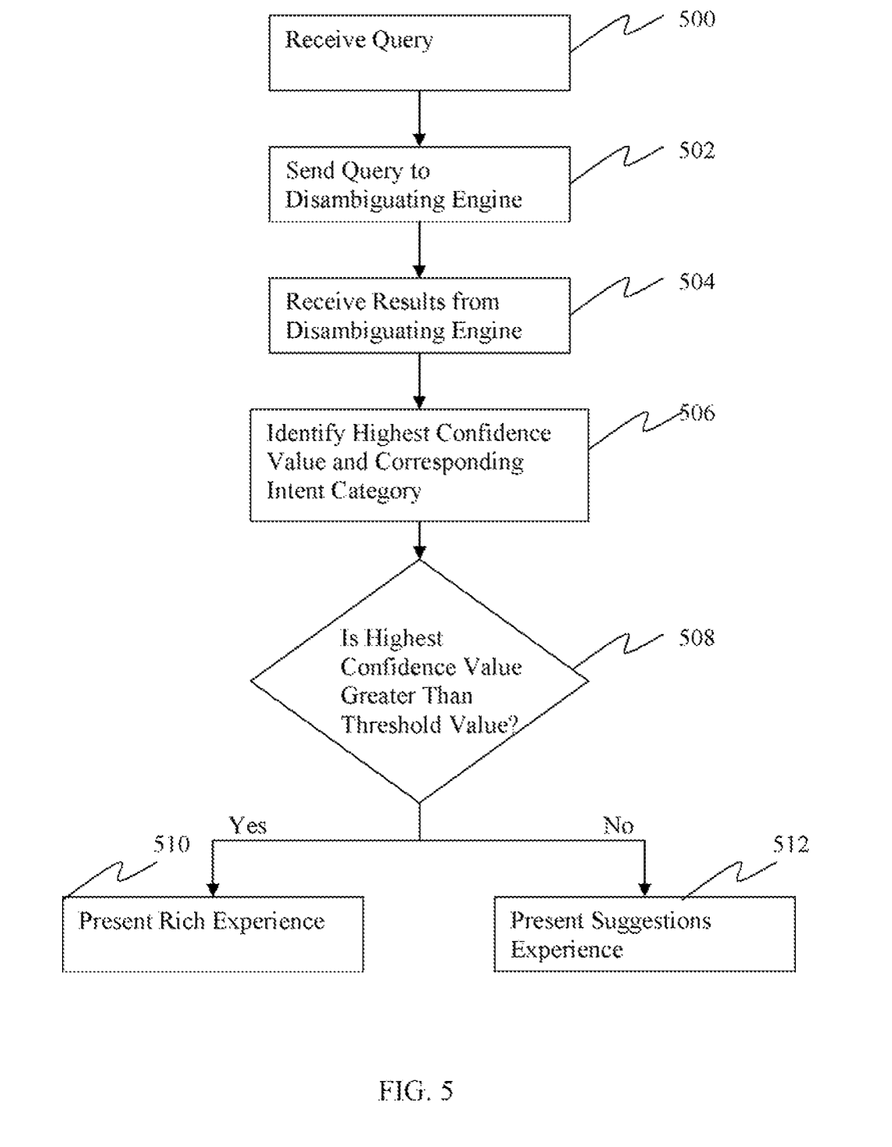
FIG. 5 is a diagram showing a flowchart of the process used for disambiguating the intent of a query and presenting a disambiguating experience.

FIG. 5 shows a flowchart of the process for disambiguating the intent of a query, which process might be used by an embodiment of the present invention. In the process's first step 500, the embodiment receives a search query. In step 502, the embodiment sends the query to a disambiguating engine. In step 504, the embodiment obtains a response from the disambiguating engine, wherein the response comprises one or more intent categories and the corresponding confidence values, one or more implicit terms, and one or more suggested terms. The implicit terms are the * terms in the *<term>* patterns. The suggested terms are the search terms derived from the identified patterns. For example, in one embodiment, the implicit terms for the search query "eagles" might be "animal", "football team", or "rock band", and the suggested terms might be "bald eagles", "Philadelphia eagles", or "eagles band". In the process's next step 506, the embodiment identifies the highest confidence value and the corresponding intent category from the received responses. The highest confidence value is then compared to a threshold value in step 508. Based on the comparison, the embodiment presents a disambiguating experience. If the highest confidence value exceeds the threshold value, the embodiment presents a rich experience in step 510. Otherwise, the embodiment presents a suggestions experience in step 512.

The rich experience in step 510 comprises displaying one or more search results from the intent category corresponding to the highest confidence value. The response from the disambiguating engine comprises one or more implicit terms. The embodiment selects one or more implicit terms and sends them along with the search query to one or more search engines. The embodiment receives one or more search results from the search engines and merges the results. This merge operation might result in the displacement of a result that is already in the set based on one or more threshold values, in some embodiments of the present invention. The merged results may entail various types of results such as texts, audios, videos, or images search results. The embodiment presents the merged results as the rich experience. For example, in one embodiment, a rich experience for the query "eagles" might entail text links to the home page of the Philadelphia Eagles football team, links to the Yahoo! Sports page for the team, images and videos of the team's football games.

The suggestions experience in step 512 comprises displaying one or more suggested search terms corresponding to the one or more intent categories in the responses from the disambiguating engines. The embodiment selects one or more intent categories based on the confidence values and then presents the suggested search terms from the selected intent categories. For example, in one embodiment, the suggestions experience might present suggested search terms such as "bald eagles", "Philadelphia eagles", or "eagles band" for the query "eagles". In other embodiments, the suggestions experience might present shortcut results such as the Yahoo! Shortcut results that link to other text, image, audio, or video results for the query "eagles".

Figure 6:
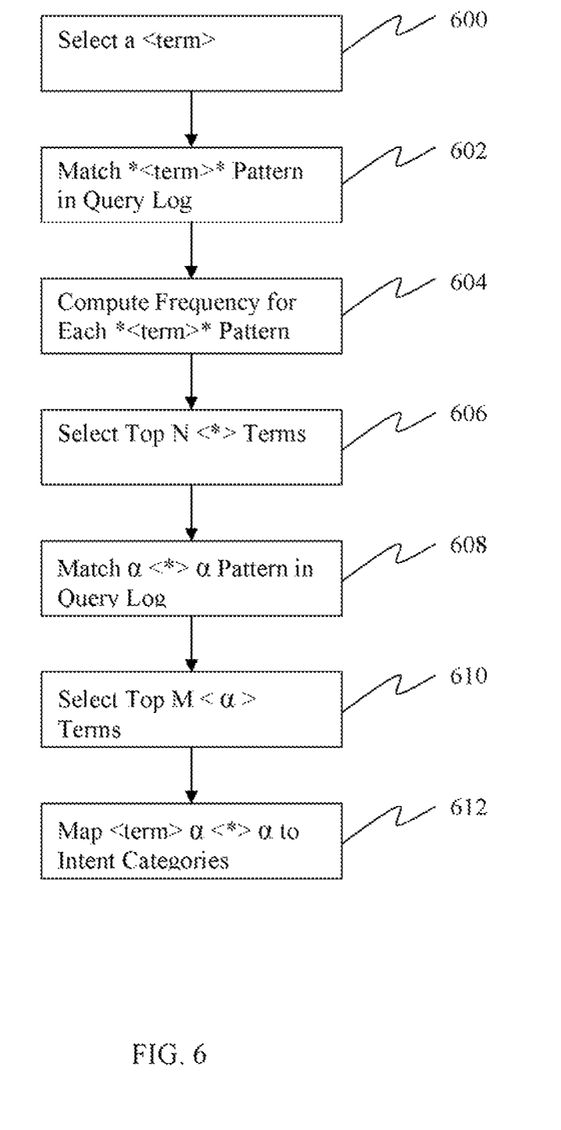
FIG. 6 is a diagram showing a flowchart of the process used for identifying additional patterns and intent categories associated with a query.

FIG. 6 shows a flowchart of the process for identifying additional intent categories of a term, which process might be used by an embodiment of the present invention. In the process's first step 600, the process selects a term which comprises one or more keywords. In step 602, the embodiment finds the queries in a query log that match the pattern in the form of *<term>*. In step 604, the embodiment computes the frequency for each matching pattern. The frequency for a matching pattern is determined by counting the number of occurrences of the matching pattern in the query log. In addition, a confidence value can be computed for each matching pattern by dividing its frequency by an aggregate frequency of all of the matching patterns. In step 606 of the process, the embodiment selects the top N number of <*> terms in the pattern *<term>*. For each <*> term in the top N <*> terms, the embodiment finds the queries in the query log that match the additional pattern α<*>α, where α comprises one or more keywords. For example, in one embodiment, for a term "jaguar", a top <*> term might be "car". The embodiment then identifies the patterns in the form of α<car>α from the query log. One of the identified α term might be "dealer". As a result, one of the additional patterns in the form of α<*>α might be identified as "car dealer". Therefore, for the original term "jaguar", the additional pattern is "jaguar car dealer" which might be mapped to an intent category called "Automobile Dealers". In step 610, the embodiment selects the top M number of <α> terms. In addition, a confidence value can be computed for each pattern α<*>α by dividing its frequency by an aggregate frequency of all of the matching patterns. In one embodiment, the <α> terms might be selected based on the confidence values. In step 612, the process concludes by associating the additional patterns with the selected term and mapping them to respective intent categories.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those of ordinary skill in the art. It is therefore not intended that the present invention be limited, except as indicated by the appended claims.

What is claimed is:

1. A method, comprising:
   selecting, by a server, a term contained within a query;
   accessing, by the server, a query log to identify one or more other queries that each include a matching pattern, each matching pattern including the selected term and one or more keywords, wherein each matching pattern is found entirely within each of one or more corresponding queries from the one or more other queries in the query log;
   determining, at the server, the frequency of each of the matching patterns in the query log, wherein the determining comprises, for each matching pattern found entirely in a corresponding query in the query log:
      comparing the matching pattern with the one or more other queries in the query log; and
      determining a number of occurrences of the matching pattern in the query log, wherein an occurrence of the matching pattern is only included to determine the frequency of the corresponding matching pattern if the occurrence of the matching pattern for a corresponding query is found entirely in the corresponding query;
   mapping, at the server, each of the matching patterns to one or more respective search intent categories; and
   selecting, at the server, one or more search intent categories for the selected term based on the frequencies of the matching patterns.

2. The method of claim 1, further comprising computing a confidence value for each of the matching patterns, wherein the selecting one or more search intent categories step comprises selecting the one or more search intent categories based on the confidence values of their associated matching patterns.

3. The method of claim 2, wherein the computing step comprises dividing the frequency of each of the matching patterns that correspond to the one or more search intent categories by an aggregate frequency of the matching patterns.

4. The method of claim 1, wherein the mapping step comprises selecting a search intent category for each of the matching patterns.

5. The method of claim 1, wherein the one or more other queries each comprise a time value; and wherein the identifying step is limited to the queries having a time value within a threshold period of time.

6. The method of claim 5, wherein the selected search intent category for the selected term is associated with the one or more other queries having a time value within the threshold period of time.

7. The method of claim 1 wherein the selected term comprises one or more keywords.

8. The method of claim 1, wherein the one or more search intent categories are predetermined lists of types of search.

9. The method of claim 1, wherein the one or more search intent categories are predetermined lists of classification groups.

10. A method, comprising:
    selecting, by a server, a term contained within a query;
    accessing, by the server, a query log to identify one or more other queries that each include a matching pattern, each matching pattern including the selected term and one or more keywords, wherein each matching pattern is found entirely within each of one or more corresponding queries from the one or more other queries in the query log;
    selecting, at the server, one or more keywords other than the selected term in each of one or more matching patterns;
    processing the query log to identify one or more second matching patterns that include the selected one or more keywords, each second matching pattern being found entirely within each of one or more corresponding queries from the one or more other queries in the query log;
    determining, at the server, the frequency of each of the one or more second matching patterns in the query log, wherein the determining comprises, for each second matching pattern found entirely in a corresponding query in the query log:
       comparing the second matching pattern with one or more other queries in the query log; and
       determining a number of occurrences of the second matching pattern in the query log, wherein an occurrence of the second matching pattern is only included to determine the frequency of the corresponding matching pattern if the occurrence of the matching pattern for a corresponding query is found entirely in the corresponding query;
    mapping, at the server, each of the one or more second matching patterns to one or more respective search intent categories; and selecting, at the server, one or more search intent categories for the selected term based on the frequencies of the one or more second matching patterns.

11. The method of claim 10, further comprising computing a confidence value for each of the second matching patterns, wherein the selecting one or more search intent categories step comprises selecting the one or more search intent categories based on the confidence values of their associated second matching patterns.

12. The method of claim 11, wherein the computing step comprises dividing the frequency of each of the second matching patterns by an aggregate frequency of the second matching patterns.

13. The method of claim 10, wherein the processing step comprises comparing the one or more second matching patterns with the one or more other queries in the query log.

14. The method of claim 10 wherein the one or more search intent categories are predetermined lists of types of search.

15. The method of claim 10 wherein the one or more search intent categories are predetermined lists of classification groups.

16. An apparatus, comprising:
a memory;
one or more processors;
logic encoded in one or more computer readable storage media, wherein the logic when executed is operable to use the one or more processors to:
select a term contained within a query;
access a query log to identify one or more other queries that each include a matching pattern, each matching pattern including the selected term and one or more keywords, wherein each matching pattern is found entirely within each of one or more corresponding queries from the one or more other queries in the query log;
determine the frequency of each of the matching patterns in the query log, wherein the logic operable to determine the frequency of each of the matching patterns comprises logic operable to, for each matching pattern found entirely in a corresponding query in the query log:
compare the matching pattern with one or more other queries in the query log; and
determine a number of occurrences of the matching pattern in the query log, wherein an occurrence of the matching pattern is only included to determine the frequency of the corresponding matching pattern if the occurrence of the matching pattern for a corresponding query is found entirely in the corresponding query;
map each of the matching patterns to one or more respective search intent categories; and
select one or more search intent categories for the selected term based on the frequencies of the matching patterns.

17. The apparatus of claim 16, wherein the one or more search intent categories are predetermined lists of types of search.

18. The apparatus of claim 16, wherein the one or more search intent categories are predetermined lists of classification groups.

19. The apparatus of claim 16, the logic further operable to compute a confidence value for each of the one or more matching patterns, wherein the logic operable to select one or more search intent categories comprises logic operable to select the one or more search intent categories based on the confidence values of their associated matching patterns.

20. The apparatus of claim 16, wherein the logic operable to compute the confidence values comprises logic operable to divide the frequency of each of the matching patterns by an aggregate frequency of the matching patterns.

* * * * *